United States Patent
Petersen et al.

Patent Number: 6,023,737
Date of Patent: Feb. 8, 2000

[54] MULTI-STAGE PIPELINED DATA COALESCING FOR IMPROVED FREQUENCY OPERATION

[75] Inventors: Thomas Albert Petersen, Austin; James Nolan Hardage, Jr., Kyle, both of Tex.

[73] Assignees: International Business Machines Corporation, Armonk, N.Y.; Motorola, Inc., Schaumburg, Ill.

[21] Appl. No.: 09/066,014

[22] Filed: Apr. 24, 1998

[51] Int. Cl.⁷ .................................................. G06F 13/00
[52] U.S. Cl. ............................................................. 710/20
[58] Field of Search ................................... 710/20, 22, 52

[56] References Cited

U.S. PATENT DOCUMENTS

| | | | |
|---|---|---|---|
| 4,530,069 | 7/1985 | Desrochers | 710/2 |
| 4,972,368 | 11/1990 | O'Bries et al. | 710/67 |
| 5,099,485 | 3/1992 | Bruckert et al. | 371/68.3 |
| 5,191,649 | 3/1993 | Cadambi et al. | 395/200 |
| 5,438,186 | 8/1995 | Nair et al. | 235/449 |
| 5,471,614 | 11/1995 | Kakimoto | 395/650 |
| 5,535,352 | 7/1996 | Bridges et al. | 710/326 |
| 5,608,869 | 3/1997 | Hamstra et al. | 395/200.01 |
| 5,664,148 | 9/1997 | Mulla et al. | 711/138 |
| 5,701,516 | 12/1997 | Cheng et al. | 710/22 |

*Primary Examiner*—David Y. Eng
*Attorney, Agent, or Firm*—Anthony V. S. England; Daniel E. Venglarik; Andrew J. Dillon

[57] ABSTRACT

To implement full gathering of data transfers from a processor to a system bus without adding many levels of logic to the write enable logic for transaction queue entries or reducing the processor operating frequency, gatherable combinations are divided and gathering is performed in multiple stages operating in parallel. During the first stage, a subset of the full gathering is performed between incoming transactions and the last transaction received, coalescing the two transfers into a single transaction entry if one of the possible combinations within the subset is satisfied. During the second stage, existing queue entries are tested for the remainder of the full gather combination set and merged if a combination within the remaining subset is satisfied. The gathering logic may thus be split between the write enable logic and the entry control logic for the transaction queue, reducing the depth of logic required for any one path and increasing the set size of gatherable combinations implemented and/or the processor operating frequency. Any additional processor cycles required to complete full gathering are typically hidden by bus latency.

20 Claims, 6 Drawing Sheets

MULTI-STAGE PIPELINED DATA COALESCING FOR IMPROVED FREQUENCY OPERATION

BACKGROUND OF THE INVENTION

1. Technical Field

The present invention relates in general to processor bus interfaces within data processing systems and in particular to gathering logic within processor bus interfaces in data processing systems. Still more particularly, the present invention relates to implementing full data gathering in a processor bus interface without degrading performance.

2. Description of the Related Art

Integrated circuits which move data within a data processing system, particularly processors, typically move data of varying sizes and varying addresses. Processors also typically operate at a frequency which is a multiple higher than the bus over which data is transferred. System buses are typically designed to provide optimal performance when handling large blocks of data, while processors typically perform smaller block accesses during instruction execution and generally have very limited large block data movement capability. To maximize the efficiency of data movement and minimize the impact of processor transfers on the bus, it is advantageous to transfer the maximum amount of data possible during a bus transaction. Data coalescing or gathering provides a hardware mechanism to combine pending bus transactions to maximize the amount of data transferred in one bus tenure once the bus is available.

Gathering is typically performed in the processor's bus interface unit as a transaction is placed into a queue of pending bus transactions. An example of transfers being written into a queue which supports gathering is shown in FIG. 5. Transactions 502 input into queue 504 for transfer on the bus (not shown) are 1, 2, 3, or 4 byte unaligned transfers (data sizes not address aligned to their natural boundary). Queue 504 in the depicted example is four bytes wide. In the example shown, entry 0 of the queue already contains a four byte store which is active on the bus. This entry is not allowed to participate in gathering since the address and size cannot change during a transfer. Any transfer added to the queue behind the four byte store in entry 0 will be available for gathering.

In the example shown, a one byte store transaction is to be added to entry 1 of queue 504 during transaction 1. Next, another one byte store to the adjacent address is to be added to queue 504 in transaction 2. The gathering logic utilizes the address and size of the previous store and the address and size of the incoming store to detect that the two entries are gatherable. Instead of transaction 2 being written into entry 2, therefore, the incoming store is written into entry 1 and is combined with the previous transaction into one bus transaction. The process is repeated with another one byte store to the adjacent address to be added to queue 504 in transaction 3 and a fourth one byte store to the adjacent address to be added to queue 504 in transaction 4, both of which are combined with the previous transactions for a total of four consecutive byte stores that gather into one four byte bus transaction.

A typical transaction queue without gathering logic within a bus interface unit is shown in FIG. 6A. Transaction queue 602 is controlled by write enable logic 604 which utilizes the sizes and addresses of available entries and selects the entry to be loaded with an incoming transaction, forming the appropriate write enable signals when there is an incoming transaction to be placed into a queue entry. Entry control logic 606 controls other queue manipulations, such as entry movement for a first-in, first-out (FIFO) implementation.

FIG. 6B shows the same transaction queue as FIG. 6A, but with the addition of standard gathering detection logic 608 to the other components. The gathering logic compares existing transactions within queue entries to incoming transactions to determine whether they are gatherable. Write enable logic 604 is delayed until gathering logic 608 completes this comparison, since whether the incoming transaction is gathered with an existing queue entry directly affects the write enable generation because the gathering logic affects which entry into which the transaction will be written. Thus, the standard approach of gathering as the queue entries are loaded, described in connection with FIG. 5, may add many logic levels between the incoming transactions and write enable logic 604. The number of levels added depends on the depth of the gathering logic, which is a function of the number of gatherable combinations possible.

Generally, incoming transactions must be written into queue 602 during the same clock cycle as they are sent to queue 602. This requires selection of an appropriate queue entry for an incoming transaction with ample time remaining in the clock cycle to perform the write of the incoming transaction into the selected queue entry.

TABLE I

| Last Input/Resident Transaction | | Incoming Transaction | |
| --- | --- | --- | --- |
| Size | Address | Size | Address |
| 1 byte | 0 × 00 | 1 byte | 0 × 01 |
| 1 byte | 0 × 00 | 2 bytes | 0 × 01 |
| 1 byte | 0 × 00 | 3 bytes | 0 × 01 |
| 1 byte | 0 × 01 | 1 byte | 0 × 02 |
| 1 byte | 0 × 01 | 2 bytes | 0 × 02 |
| 1 byte | 0 × 02 | 1 byte | 0 × 03 |
| 2 bytes | 0 × 00 | 1 byte | 0 × 02 |
| 2 bytes | 0 × 00 | 2 bytes | 0 × 02 |
| 2 bytes | 0 × 01 | 1 byte | 0 × 03 |
| 3 bytes | 0 × 00 | 1 byte | 0 × 03 |
| 1 byte | 0 × 03 | 1 byte | 0 × 02 |
| 1 byte | 0 × 03 | 2 bytes | 0 × 01 |
| 1 byte | 0 × 03 | 3 bytes | 0 × 00 |
| 1 byte | 0 × 02 | 1 byte | 0 × 01 |
| 1 byte | 0 × 02 | 2 bytes | 0 × 00 |
| 1 byte | 0 × 01 | 1 byte | 0 × 00 |
| 2 bytes | 0 × 02 | 1 byte | 0 × 01 |
| 2 bytes | 0 × 02 | 2 bytes | 0 × 00 |
| 2 bytes | 0 × 01 | 1 byte | 0 × 00 |
| 3 bytes | 0 × 01 | 1 byte | 0 × 00 |

As the number of gatherable combinations increases, more clock cycle time is required by gathering logic 608 to perform the necessary comparisons. The example depicted in FIG. 5, for instance, requires comparison logic for 20 possible gatherable transactions. Queue 504 is connected to a simple, four byte wide bus which may service unaligned transactions of 1, 2, 3, or 4 bytes. The gatherable transaction pairs for this configuration are listed above in Table I. For this simple configuration, there are 20 gatherable transaction pairs. Gathering logic 608 must perform the necessary comparisons for all gatherable pairs, adding many levels of logic (gathering logic 608) directly to the entry write enable logic 604 for transaction queue 602.

As bus widths and bus transaction sizes increase, the number of gatherable combinations increase substantially. Contemporary processors employ 16 byte wide system buses and support transfers of between 1 and 256 bytes per single bus transaction. The number of gatherable transfer combination in such a configuration is many times larger than the above simple four byte example depicted in FIG. 5 and listed in Table I. With such a large number of gatherable combinations, gathering logic 608 for detecting whether entries are gatherable becomes so large that generally either only a very small subset of complete gathering is implemented or the processor operating frequency is reduced to allow the logic depth necessary for full gathering. Both alternatives degrade processor and/or system performance.

It would be desirable, therefore, to provide a mechanism supporting full gathering in a data processing system without adding many levels of logic to the write enable logic for a transaction queue. It would further be advantageous for the gathering mechanism to not reduce processor operating frequencies.

SUMMARY OF THE INVENTION

It is therefore one object of the present invention to provide an improved method and apparatus for implementing a processor bus interface within a data processing system.

It is another object of the present invention to provide method and apparatus for implementing data gathering logic within processor bus interfaces in data processing systems.

It is yet another object of the present invention to provide a method and apparatus for implementing full data gathering in a processor bus interface without degrading performance.

The foregoing objects are achieved as is now described. To implement full gathering of data transfers from a processor to a system bus without adding many levels of logic to the write enable logic for transaction queue entries or reducing the processor operating frequency, gatherable combinations are divided and gathering is performed in multiple stages operating in parallel. During the first stage, a subset of the full gathering is performed between incoming transactions and the last transaction received, coalescing the two transfers into a single transaction entry if one of the possible combinations within the subset is satisfied. During the second stage, existing queue entries are tested for the remainder of the full gather combination set and merged if a combination within the remaining subset is satisfied. The gathering logic may thus be split between the write enable logic and the entry control logic for the transaction queue, reducing the depth of logic required for any one path and increasing the set size of gatherable combinations implemented and/or the processor operating frequency. Any additional processor cycles required to complete full gathering are typically hidden by bus latency and the fact that the processor is typically operating multiple times faster than the system bus.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
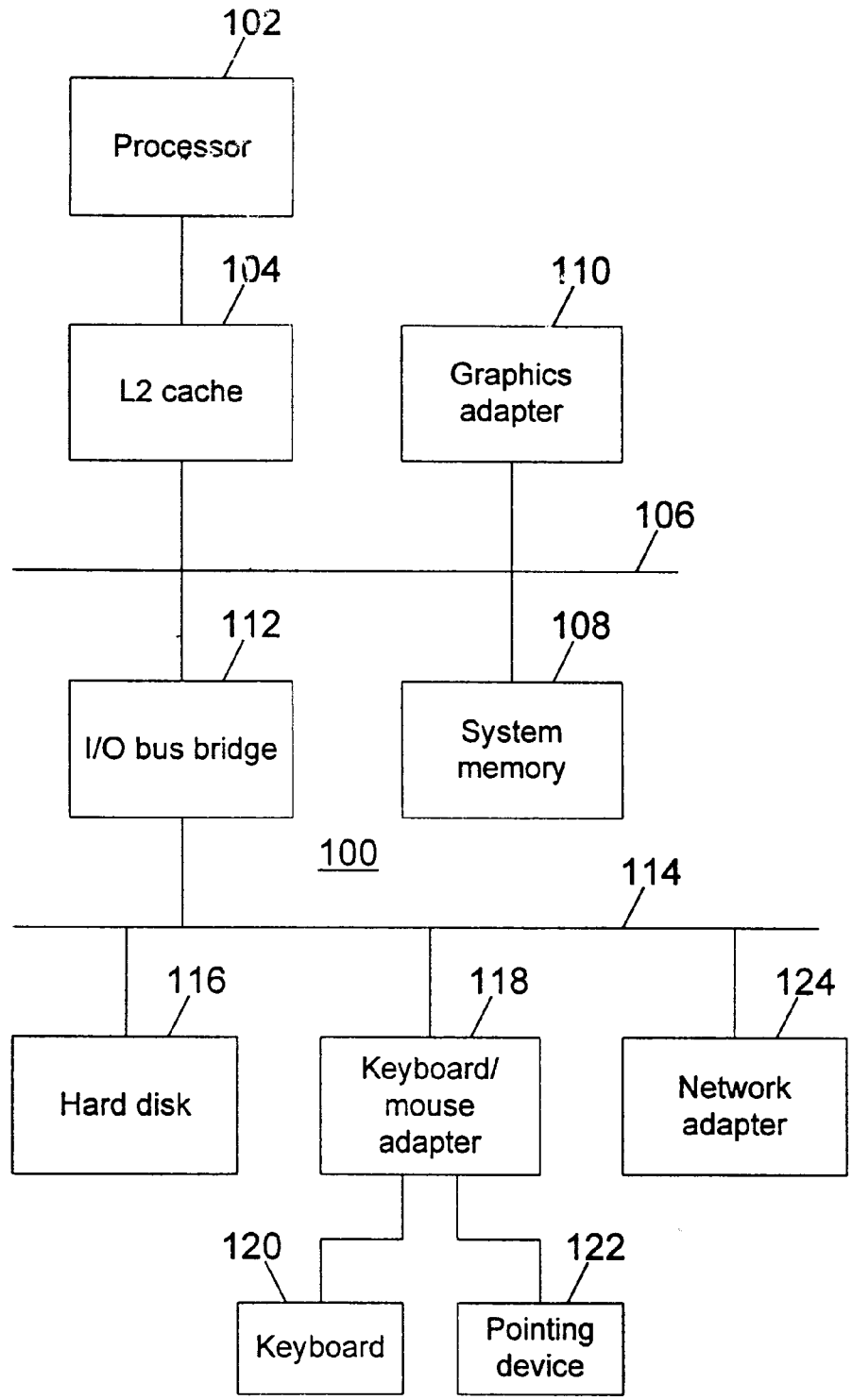
FIG. 1 depicts a block diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 in the exemplary embodiment includes a processor 102, which may be a PowerPC™ processor available from International Business Machines Corporation of Armonk, N.Y. or Motorola Corporation of Schaumburg, Ill. Processor 102 is connected to a level two (L2) cache 104, which is utilized to stage data to and from processor 102 at reduced access latency. L2 cache 104 is connected in turn to an interconnect or system bus 106, which is also is connected, in the embodiment depicted, to system memory 108 and memory-mapped graphics adapter 110, which provides a connection for a display device (not shown).

Also connected to system bus 106 in the exemplary embodiment is input/output (I/O) bus bridge 112, which provides an interface between system bus 106 and I/O bus 114. A nonvolatile memory such as hard disk drive 116 may be connected to I/O bus 114, as may keyboard/mouse adapter 118, which provides connection to I/O bus 114 for keyboard 120 and pointing device 122. Pointing device 122 may be a mouse, trackball, or the like. Also connected to I/O bus 114 may be network adapter 124 for connecting data processing system 100 to a local area network (LAN), the Internet, or both. Those skilled in the art will appreciate that other devices may be incorporated into data processing system 100, such as an optical disk drive or a modem.

The operation of data processing systems of the type depicted in FIG. 1 is well known in the art. Program information comprising instructions and/or data is stored on nonvolatile memory 116 and may be selectively copied into system memory 108 once data processing system 100 is powered on. Processor 102 executes the instructions within such program information and generates text or graphical information for presentation on display device connected via graphics adapter 110, where the information may be viewed by a user. The user may selectively control operation of data processing system 100 through input entered on keyboard 120 or through pointing device 122.

In accordance with the present invention, data processing system 100 supports full gathering by splitting gatherable combination detection into portions which may operate in parallel, as described in further detail below. The mechanism and method for full gathering may be implemented in connection with a bus transaction queue in a bus interface unit within processor 102, L2 cache 104, or any other suitable device.

Figure 2:
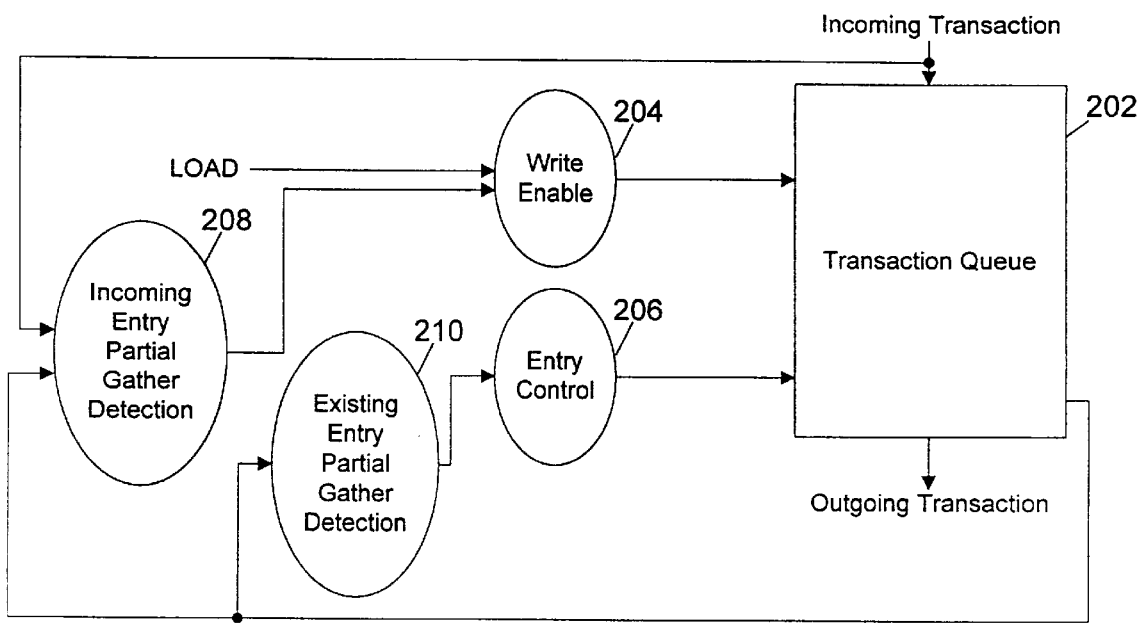
FIG. 2 is a block diagram of a transaction queue implementing full gathering in accordance with a preferred embodiment of the present invention.

Referring to FIG. 2, a block diagram of a transaction queue implementing full gathering in accordance with a preferred embodiment of the present invention is illustrated. Transaction queue 202 includes a plurality of entries, entry 0, entry, 1, entry 2, etc. Transaction queue receives incoming data transfer transactions from a processor, cache, or the like, and transmits outgoing transactions on a system bus. Placement of incoming transactions into transaction queue 202 is controlled by write enable logic 204, which determines the available entries and selects an entry to be loaded with the incoming transaction by forming the appropriate write enable signals.

Entries within transaction queue 202 may be shifted or otherwise manipulated in response to signals received from entry control logic 206. Entry control logic 206 controls queue manipulations such as entry movement for a FIFO implementation of transaction queue 202 as data transfers for queued transactions are completed on the system bus. Entry control logic 206 in the present invention may also combine adjacent transaction queue entries into a single entry.

The complete set of gatherable transaction pairs is divided in the present invention, such that portions of the gathering are done in different stages of a multi-stage process, with the different portions of the gathering being performed in parallel. The exemplary embodiment of FIG. 2 depicts a simple, two stage example of the present invention. In the first stage of gathering, performed in incoming entry partial gather detection logic 210, implements a subset of full gathering and operates only on incoming transactions and the last transaction received. The second stage of gathering, performed by existing entry partial gather detection logic 212, implements the remaining combinations of full gathering and concurrently operates on transaction entries already within transaction queue 202.

The decomposition of gathering into multiple stages allows a portion of the gathering logic to be placed in the entry control generation path and the remaining portion inserted in the write enable generation path. Since write enable logic 204 and entry control logic 206 may operate in parallel, the depth of logic added to any one path is decreased. A decreased depth of logic allows either a larger set of gatherable combinations to be implemented or a higher processor operating frequency to be employed.

Figure 3:
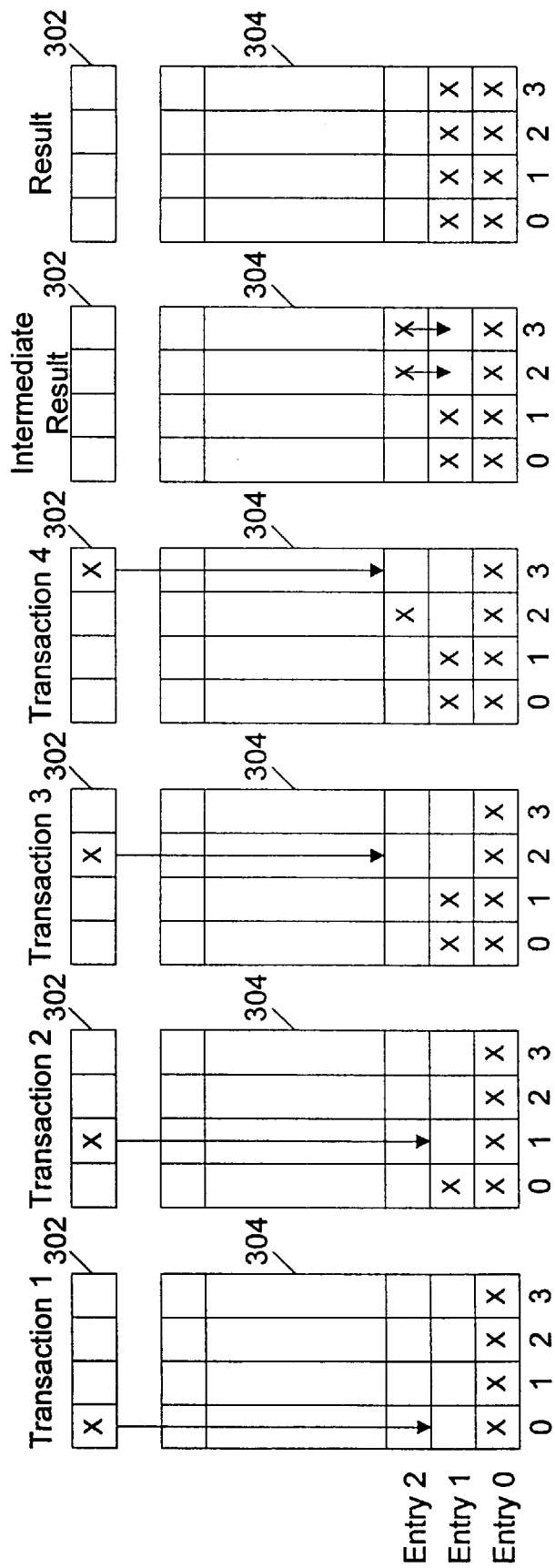
FIG. 3 depicts a diagram for an example of transfers being written into a transaction queue which supports multi-stage gathering in accordance with a preferred embodiment of the present invention.
Figure 5:
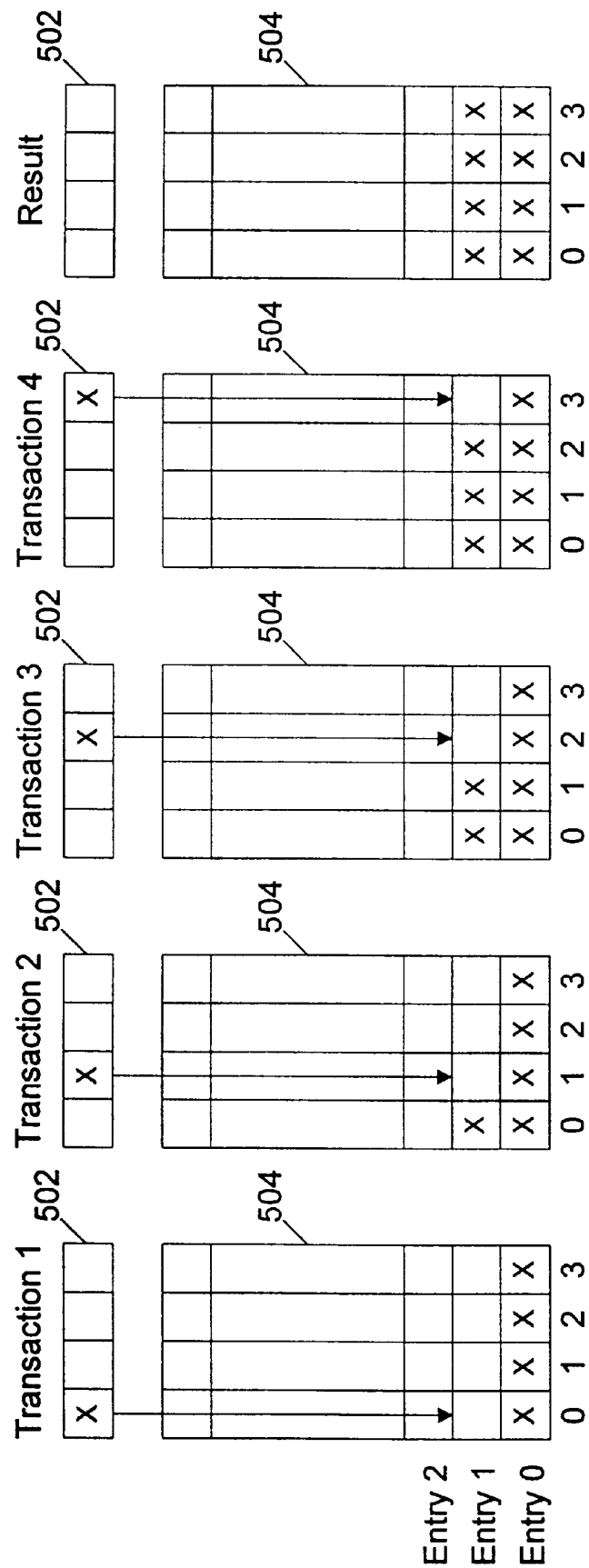
FIG. 5 depicts a diagram for an example of transfers being written into a queue which supports gathering in accordance with the known art.
Figure 6A:
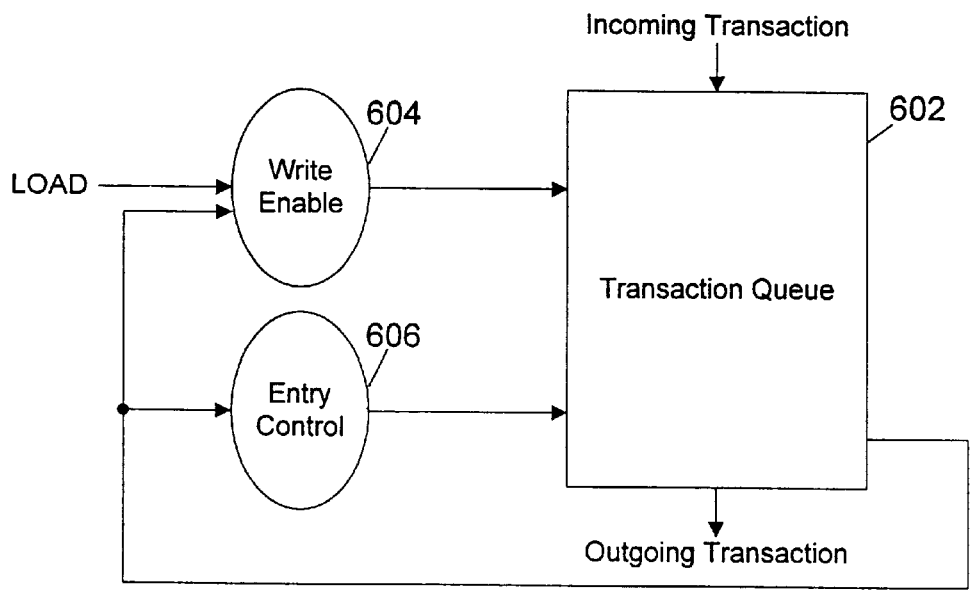
FIGS. 6A–6B are block diagrams of transaction queues implementing no gathering or full gathering in accordance with the known art.
Figure 6B:
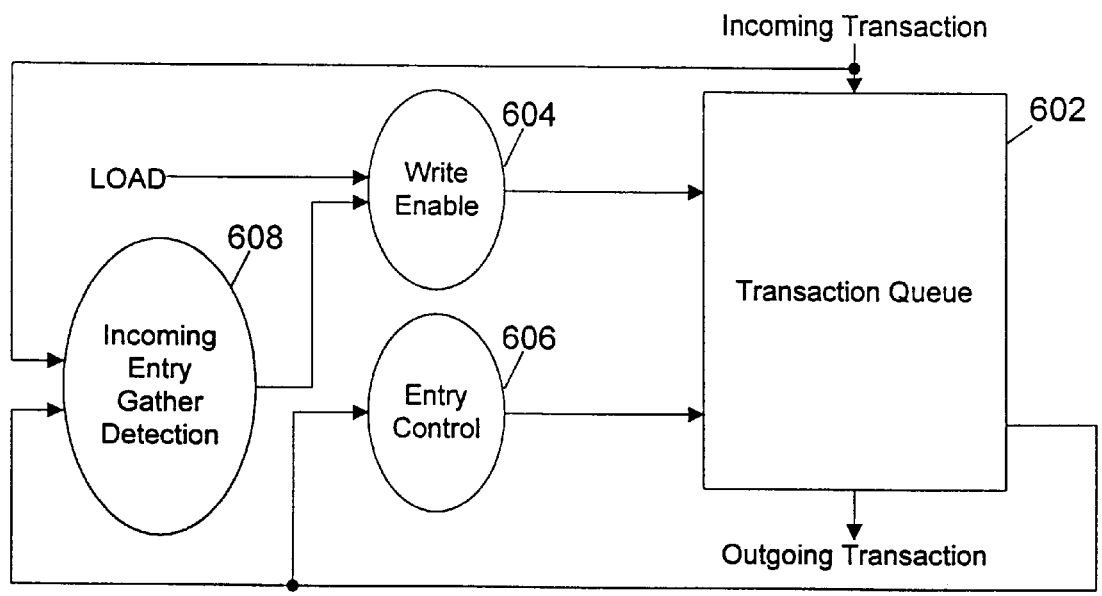

With reference now to FIG. 3, a diagram for an example of transfers being written into a transaction queue which supports multi-stage gathering in accordance with a preferred embodiment of the present invention is depicted. The same simple 4 byte wide bus supporting unaligned transfers of 1, 2, 3 or 4 bytes described above in connection with FIG. 5 is again employed, as is the same transaction stream. In the example depicted, the first stage gathers all byte-to-byte combinations of incoming transactions with the last transaction received. Thus the incoming entry partial gather detection logic need only make comparisons for 12 possible combinations, rather than the full twenty. All other size combinations are gathered in the second stage, by the existing entry partial gather detection logic. This gather operates on entries present in the transaction queue requires comparisons for only eight potential combinations.

As described earlier, entry 0 contains a transaction in progress which may not be altered. The first one byte data transfer received in transaction 1 is not gatherable, and thus is written to entry 1 of the transaction queue. The next one byte data transfer to an adjacent address received in transaction 2 is detected as gatherable by the incoming gather detection logic and is accordingly written into entry 1 of the transaction queue.

Since the last written entry in the transaction queue, entry 1, now has two bytes, subsequent incoming data transfers may not be gathered with this transaction by the incoming gather detection logic, which detects only one byte to one byte combinations. Therefore the transfer received in transaction 3, although a one byte transfer to an adjacent address, is not detected as gatherable when received and is written to entry 2 of the transaction queue. The transfer received in transaction 4, however, which is another one byte transfer to an adjacent address, is detected as gatherable with the existing byte in entry 2 and is therefore written to entry 2.

These partial gathers form the intermediate result of a two byte transfer in entry 1 and a two byte transfer to an adjacent address in entry 2 of the transaction queue. Finally, in the next cycle the existing entry gather detection logic, which handles all combination sizes other than one byte to one byte comparisons, detects that entries 1 and 2 within the transaction queue are gatherable. The two entries are therefore merged into one transaction.

Due to the pipelined nature of this multi-stage gathering approach, the example depicted in FIG. 3 takes one processor clock cycle longer to fully gather pending entries than would have been required under the prior art approach. However, additional cycles used to perform gathering are usually hidden by bus latency. Since the system bus operates at a much lower frequency than the processor, any pending entries may have many processor clock cycles to be manipulated and coalesced before overall performance is compromised by the approach of the present invention.

Figure 4A:
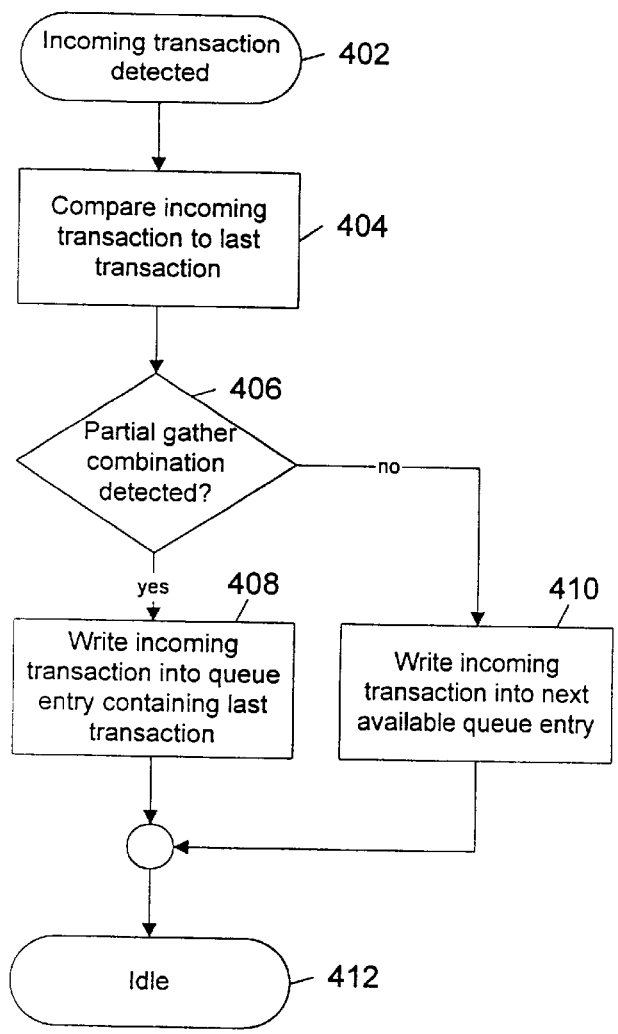
FIGS. 4A–4B are high level flowcharts for a process of implementing full gathering in accordance with a preferred embodiment of the present invention.
Figure 4B:
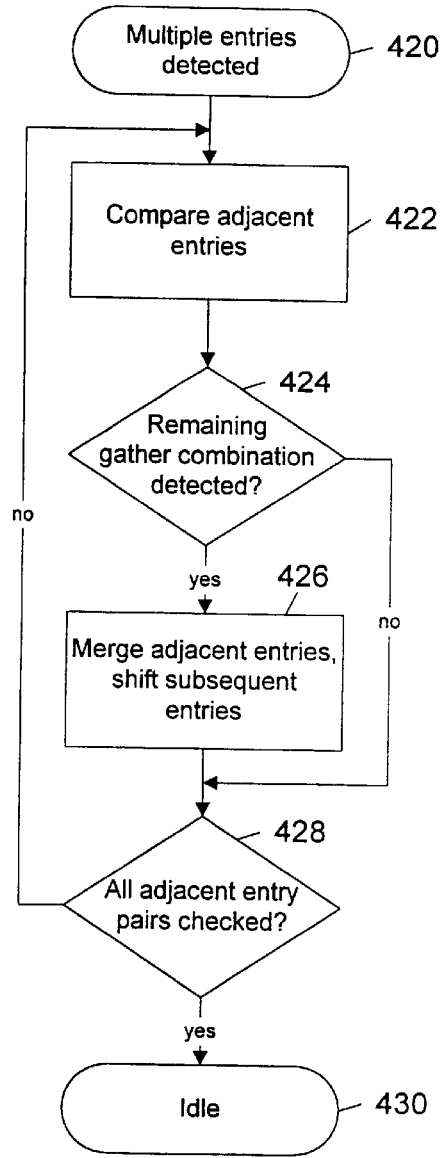

Referring to FIGS. 4A–4B, high level flowcharts for a process of implementing full gathering in accordance with a preferred embodiment of the present invention is depicted. The processes depicted are executed simultaneously, in parallel to minimize the impact on processor operating frequency. FIG. 4A illustrates the process of the first stage of the present invention, partial gathering of incoming data transfers with queued transfers. The process begins at step 402, which depicts detecting an incoming data transfer. The process next passes to step 404, which illustrates comparing the incoming data transfer to the last queued data transfer, and then to step 406, which depicts a determination of whether a partial gather combination—two data transfers having sizes and an address relationship which the incoming entry gather detection logic is assigned to identify—is detected.

If a partial gather combination is detected, the process proceeds to step 408, which illustrates writing the incoming data transfer into the queue entry containing the last received data transfer. If not, however, the process proceeds instead to step 410, which depicts writing the incoming data transfer into the next available queue entry. From either of steps 408 or 410, the process passes to step 412, which illustrates the process becoming idle until another incoming data transfer is detected.

FIG. 4B illustrates the process of the second stage of the present invention, gathering queued transactions. The process begins at step 420, which depicts detection of multiple entries within the queue (excluding any entry actively being transferred on the bus). The process next passes to step 422, which illustrates comparing two adjacent entries within the transaction queue, and then to step 424, which depicts a determination of whether "remaining gather combinations"—those data transfer pairs having sizes and an address relationship which the existing entry gather detection logic is assigned to identify—is detected.

If a gatherable pair of adjacent entries is detected, the process proceeds to step 426, which illustrates merging the adjacent entries and shifting subsequent entries within the transaction queue, and then passes to step 428. If the adjacent transaction entry pair is not gatherable, however, the process proceeds instead directly to step 428, which depicts a determination of whether all adjacent entry pairs have been checked. If not, the process returns to step 422, and continues comparing adjacent transaction pairs within the transaction queue. If so, however, the process passes to step 430, which illustrates the process becoming idle until a new transaction is written to the queue, creating a new adjacent transaction pair.

With the approach of the present invention to gathering, the gathering logic is divided into two stages which may operate in parallel. The benefit of this division of gathering logic into multiple stages is a decrease in the depth of logic traversed each processor clock cycle. This prevents the gathering logic from impacting the operating frequency of the processor while allowing more complete gathering to be implemented. More complete gathering, in turn, maximizes system performance by efficiently utilizing the system bus.

While the invention has been particularly shown and described with reference to a preferred embodiment, it will be understood by those skilled in the art that various changes in form and detail may be made therein without departing from the spirit and scope of the invention.

What is claimed is:

1. A method of pipelining the coalescing of data transactions, comprising:

receiving a first transaction for transfer and placing the first transaction in a first queue entry within a queue, wherein the first transaction becomes a last resident transaction within the queue;

receiving a second transaction for transfer;

determining whether the second transaction and the last resident transaction fall within a subset of gatherable combinations;

responsive to determining that the second transaction and the last resident transaction do not fall within the subset of gatherable combinations, placing the second transaction in a second queue entry, wherein the second transaction becomes the last resident transaction within the queue; and determining whether the first queue entry and the second queue entry contain transactions satisfy a remaining subset of gatherable combinations.

2. The method of claim 1, wherein the step of determining whether the second transaction and the last resident transaction fall within a subset of gatherable combinations further comprises:

checking a size of the last resident transaction;

comparing the size of the last resident transaction to a size of transactions within the subset of gatherable combinations; and responsive to determining that a size of the last resident transaction does not satisfy the size of transactions within the subset of gatherable combinations, placing the second transaction in the second queue entry.

3. The method of claim 1, wherein the step of determining whether the second transaction and the last resident transaction fall within a subset of gatherable combinations further comprises:

checking a size of the second transaction;

comparing the size of the second transaction to a size of transactions within the subset of gatherable combinations; and responsive to determining that a size of the second transaction does not satisfy the size of transactions within the subset of gatherable combinations, placing the second transaction in the second queue entry.

4. The method of claim 1, wherein the step of determining whether the second transaction and the last resident transaction fall within a subset of gatherable combinations further comprises:

comparing an address and size of the second transaction and an address and size of the last resident transaction to addresses and sizes of gatherable combinations within the subset; and responsive to determining that an address and size of the second transaction satisfies addresses and sizes of a gatherable combination within the subset, placing the second transaction in the first queue entry.

5. The method of claim 1, further comprising:

responsive to determining that the first and second transactions fall within the subset of gatherable combinations, placing the second transaction in the first queue entry with the first transaction, wherein the combined first and second transactions become the last resident transaction within the queue.

6. The method of claim 5, further comprising:

receiving a third transaction for transfer;

determining whether the third transaction and the last resident transaction within the queue fall within the subset of gatherable combinations; and responsive to determining that the third transaction and the last resident transaction do not fall within the subset of gatherable combinations, placing the third transaction in the second queue entry, wherein the third transaction becomes the last resident transaction within the queue.

7. The method of claim 6, further comprising:

receiving a fourth transaction for transfer;

determining whether the fourth transaction and the last resident transaction fall within the subset of gatherable combinations; and responsive to determining that the fourth transaction and the last resident transaction fall within the subset of gatherable combinations, placing the fourth transaction in the second queue entry with the third transaction, wherein the third transaction and the fourth transaction become the last resident transaction.

8. The method of claim 7, further comprising:

determining whether transactions within the first and second queue entries fall within the remaining subset of gatherable combinations; and responsive to determining that transactions within the first and second queue entries transaction fall within the remaining subset of gatherable combinations:

merging the first and second queue entries; and shifting subsequent entries within the queue.

9. A mechanism for pipelining the coalescing of data transactions, comprising:

a queue containing a first transaction in a first queue entry within the queue, wherein the first transaction is a last resident transaction within the queue;

receiving means for receiving a second transaction for transfer;

incoming entry partial gather detection logic determining whether the second transaction and the last resident transaction fall within a subset of gatherable combinations;

write enable logic, responsive to determining that the second transaction and the last resident transaction do not fall within the subset of gatherable combinations, placing the second transaction in a second queue entry, wherein the second transaction becomes the last resident transaction within the queue; and existing entry partial gather detection logic determining whether the first queue entry and the second queue entry contain transactions satisfy a remaining subset of gatherable combinations.

10. The mechanism of claim 9, wherein the incoming entry partial detection gather logic further comprises:

logic for checking a size of the last resident transaction;

logic for comparing the size of the last resident transaction to a size of transactions within the subset of gatherable combinations; and signal means, responsive to determining that a size of the last resident transaction does not satisfy the size of transactions within the subset of gatherable combinations, for signalling the write enable logic to place the second transaction in the second queue entry.

11. The mechanism of claim 9, wherein the incoming entry partial gather detection logic further comprises:

logic for checking a size of the second transaction;

logic for comparing the size of the second transaction to a size of transactions within the subset of gatherable combinations; and signal means, responsive to determining that a size of the second transaction does not satisfy the size of transactions within the subset of gatherable combinations, for signalling the write enable logic to place the second transaction in the second queue entry.

12. The mechanism of claim 9, wherein the incoming entry partial gather detection logic further comprises:

logic for comparing an address and size the second transaction and an address and size of the last resident transaction to addresses and sizes of gatherable combinations within the subset; and signal means, responsive to determining that an address and size of the second transaction and an address and size of the second transaction satisfies addresses and sizes a gatherable combination within the subset, for signalling the write enable logic to place the second transaction in the first queue entry.

13. The mechanism of claim 9, wherein the write enable logic further comprises:

means, responsive to determining that the first and second transactions fall within the subset of gatherable combinations, for placing the second transaction in the first queue entry with the first transaction, wherein the combined first and second transactions become the last resident transaction within the queue.

14. The mechanism of claim 13, further comprising:

receiving means for receiving a third transaction for transfer;

means within the incoming entry partial gather detection logic for determining whether the third transaction and the last resident transaction within the queue fall within the subset of gatherable combinations; and signal means, responsive to determining that the third transaction and the last resident transaction do not fall within the subset of gatherable combinations, for signalling the write enable logic to place the third transaction in the second queue entry, wherein the third transaction becomes the last resident transaction within the queue.

15. The mechanism of claim 14, further comprising:

receiving means for receiving a fourth transaction for transfer;

means within the incoming entry partial gather detection logic for determining whether the fourth transaction and the last resident transaction fall within the subset of gatherable combinations; and signal means, responsive to determining that the fourth transaction and the last resident transaction fall within the subset of gatherable combinations, for signalling the write enable logic to place the fourth transaction in the second queue entry with the third transaction, wherein the third transaction and the fourth transaction become the last resident transaction.

16. The mechanism of claim 15, further comprising:

means within the existing entry partial gather detection logic for determining whether transactions within the first and second queue entries fall within the remaining subset of gatherable combinations; and entry control logic, responsive to determining that transactions within the first and second queue entries transaction fall within the remaining subset of gatherable combinations, merging the first and second queue entries and shifting subsequent entries within the queue.

17. A method of pipelining the coalescing of data transactions, comprising:

receiving transactions for entry within a transfer queue;

for each received transaction:
  determining whether the received transaction and a last resident transaction within the queue satisfy a subset of gatherable transaction combinations;
  responsive to determining that the received transaction and the last resident transaction satisfy the subset of gatherable combinations, placing the received transaction in a queue entry containing the last resident transaction; and
  responsive to determining that the received transaction and the last resident transaction do not satisfy the subset of gatherable combinations, placing the received transaction in a queue entry subsequent to the queue entry containing the last resident transaction;

determining whether transactions within an adjacent pair of queue entries satisfy a remaining subset of gatherable transaction combinations; and responsive to determining that transactions within the adjacent pair of queue entries satisfy the remaining subset of gatherable combinations:
  merging the adjacent pair of queue entries; and
  shifting subsequent entries within the queue.

18. The method of claim 17, wherein determining whether the received transaction and a last resident transaction within the queue satisfy a subset of gatherable transaction combinations further comprises:

determining whether the received transaction and the last resident transaction satisfy a byte-to-byte subset of gatherable combinations.

19. The method of claim 17, further comprising:

comparing each received transaction to the last resident transaction within the queue;

placing a received transaction within a queue entry containing the last resident transaction if the received transaction and the last resident transaction satisfy the subset of gatherable combinations; and otherwise placing the received transaction in a next available queue entry.

20. The method of claim 17, further comprising:

comparing transactions within each adjacent pair of queue entries within the queue; and responsive to determining that transactions within any adjacent pair of queue entries satisfy the remaining subset of gatherable combinations, merging the transactions within that adjacent pair of queue entries and shifting subsequent entries within the queue.

* * * * *